(12) United States Patent
Hirakawa et al.

(10) Patent No.: US 9,143,687 B2
(45) Date of Patent: Sep. 22, 2015

(54) METHOD OF ANALYZING MOTION BLUR USING DOUBLE DISCRETE WAVELET TRANSFORM

(71) Applicants: Keigo Hirakawa, Dayton, OH (US); Yi Zhang, Dayton, OH (US)

(72) Inventors: Keigo Hirakawa, Dayton, OH (US); Yi Zhang, Dayton, OH (US)

(73) Assignee: University of Dayton, Dayton, OH (US)

( * ) Notice: Subject to any disclaimer, the term of this patent is extended or adjusted under 35 U.S.C. 154(b) by 0 days.

(21) Appl. No.: 13/830,597

(22) Filed: Mar. 14, 2013

(65) Prior Publication Data

US 2013/0271616 A1   Oct. 17, 2013

Related U.S. Application Data

(60) Provisional application No. 61/610,661, filed on Mar. 14, 2012.

(51) Int. Cl.
*H04N 5/228* (2006.01)
*H04N 5/232* (2006.01)
*G06T 5/00* (2006.01)
*G06T 5/10* (2006.01)

(52) U.S. Cl.
CPC ............ *H04N 5/23267* (2013.01); *G06T 5/003* (2013.01); *G06T 5/10* (2013.01); *G06T 2207/20201* (2013.01)

(58) Field of Classification Search
USPC .......... 348/208.6, 208.99; 382/107, 199, 240, 382/255, 261, 264, 275, 278, 279
See application file for complete search history.

(56) References Cited

U.S. PATENT DOCUMENTS

| | | | |
|---|---|---|---|
| 6,611,627 B1 * | 8/2003 | LaRossa et al. | 382/240 |
| 7,884,854 B2 * | 2/2011 | Banner et al. | 348/208.99 |
| 8,294,811 B2 | 10/2012 | Kulkarni | |
| 2006/0158523 A1 * | 7/2006 | Estevez et al. | 348/208.4 |
| 2007/0165961 A1 | 7/2007 | Lu | |
| 2008/0285856 A1 * | 11/2008 | Zahavi et al. | 382/195 |
| 2011/0019932 A1 * | 1/2011 | Hong | 382/255 |
| 2011/0090352 A1 * | 4/2011 | Wang et al. | 348/208.6 |
| 2013/0011051 A1 | 1/2013 | Bottisti et al. | |
| 2013/0063616 A1 * | 3/2013 | Ishii et al. | 348/208.6 |

* cited by examiner

*Primary Examiner* — Sinh Tran
*Assistant Examiner* — Zhenzhen Wu
(74) *Attorney, Agent, or Firm* — Porter, Wright, Morris & Arthur LLP

(57) ABSTRACT

A method of processing a motion blurred image from an imaging device to recover a latent sharp image. The method includes capturing a motion blurred image signal through the imaging device, computing a second signal as a two-dimensional wavelet transform of the motion blurred image signal, and using the second signal to perform a first autocorrelation analysis to estimate the blur kernel. After estimating the blur kernel, a local autocorrelation analysis yields a blur kernel length and direction at each pixel location of the motion blurred image. In addition, the second signal is denoised and the discrete wavelet transform coefficients reconstructed from the blur kernel length and direction. Performing an inverse discrete wavelet transform of the discrete wavelet transform coefficients recovers the latent sharp image.

21 Claims, 18 Drawing Sheets

(a) defocus     (b) camera shake     (c) object motion

METHOD OF ANALYZING MOTION BLUR USING DOUBLE DISCRETE WAVELET TRANSFORM

CROSS REFERENCE TO RELATED APPLICATIONS

This application claims priority to U.S. Provisional Patent Application No. 61/610,661, filed on Mar. 14, 2012, entitled "Analysis of Motion Blur Using Double Discrete Wavelet Transform."

BACKGROUND

Image blur in digital imaging generally is caused by a pixel recording light from multiple locations of a scene. Illustrated in FIG. 1 are three common types of blur: defocus, camera shake and object motion. Defocus blur occurs when light rays originating from the same point on a scene do not converge on the image plane (i.e. the sensor plane), with wider lens apertures resulting in more defocus blur. Camera motion during the exposure produces global motion blur where the same point of the scene is observed by multiple moving pixel sensors. Object motion causes each pixel to observe light from multiple points on the scene, and produces spatially-variant motion blur. Assuming Lambertian surfaces, blur is typically represented by the implied blur kernel that acts on the unobserved, sharp, in-focus image. A blurred image can be mathematically described as the convolution of the in-focus version of the image with a blur kernel.

Blur is a part of everyday photography. Long exposure is needed to overcome poor lighting conditions, but it increases the risk of camera shake and object motion blurs that severely deteriorate the sharpness of the image. Automatic or manual focus is also a challenge when the scene covers a wide range of depths or is rapidly changing (e.g. sports photography), often causing unwanted defocus blur. On the other hand, professional photographers use well-controlled blur to enhance the aesthetics of a photograph. Thus, the ability to manipulate blur in postprocessing would offer greater flexibility in consumer and professional photography.

Blur is also important for computer vision such as bar code scanners (1D and 2D) and other machine vision implementations. Blur may vary across the spatial location (e.g. a scene with multiple moving objects or multiple depths) or be global (e.g. camera shake). The blur resulting from camera shake or object motion can provide valuable information regarding the temporal state of the camera and the scene. The defocus blur kernel varies with the object distance/depth, which can be useful for three-dimensional scene retrieval from a single camera. Blur also interferes with recognition tasks, as feature extraction from a blurry image is a real challenge.

Recent advancements on blind and non-blind deblurring have enabled the handling of complex uniform blur kernels. By comparison, progress in blind and non-blind deblurring for spatially varying blur kernels has been slow, since there is limited data availability to support localized blur kernels. For this reason, it is more common to address this problem using multiple input images and additional hardware. Approaches to computational solutions include supervised or unsupervised foreground/background segmentation, statistical modeling, and partial differential equation (PDE) methods. In particular, sparsifying transforms have played key roles in the detection of blur kernels—gradient operator, shock filter, and wavelet transforms have been used for this purpose. However, existing works have shortcomings, such as problems with ringing artifacts in deblurring or the inability to handle spatially varying blur. It is also common for deblurring algorithms to require multiple iterations, which is highly undesirable for many real-time applications.

Accordingly, to detect motion blur and reconstruct a sharp image, it is desirable to have a method for estimating a blur kernel from a captured blurry image. It is desirable that the method provide for fast, accurate recreation of the latent sharp image from the captured blurry image. Additionally, it is desirable to have a method for analyzing a blurry image which can reconstruct the latent sharp image regardless of how the blur was created, and which can process both global and spatially variant blurs.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings. In the drawings, like numerals represent like elements throughout the several views.

Figure 1:
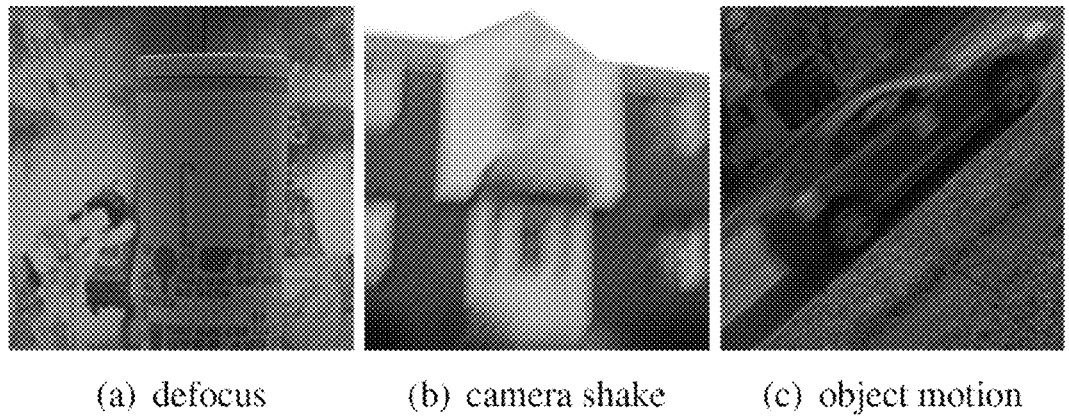
FIG. 1 depicts a series of images acquired by a conventional DSLR camera showing different types of image blur, wherein (a) is defocus, (b) is camera shake, and (c) is object motion.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of embodiments of the present invention, and together with the description, serve to explain the principles of the invention; it being understood, however, that this invention is not limited to the precise arrangements shown.

DETAILED DESCRIPTION

The present invention addresses the analysis, detection, and/or processing of blur kernels and blurry images. One embodiment described herein provides a method of using a double discrete wavelet transform (DDWT) to sparsify a blurred image and a blur kernel simultaneously. DDWT coefficients have a very intuitive interpretation and simplify the task of decoupling the blur from the image signal, regardless of why the blur occurred (e.g. object motion, defocus, camera shake) or the type of blur (e.g. global and spatially varying blur). The DDWT image analysis described herein provides a broad ranging tool for computer vision and image processing applications. For example, embodiments described herein provide a method of using a DDWT as an analytical tool to obtain blur kernel estimations, motion deblurring, and near-blur-invariant image features.

In the following description, methods and systems for detecting and reducing motion blur in a captured image are disclosed. The methods may be embodied in a software application comprising computer executable instructions executed by a processing unit including but not limited to a personal computer (i.e. an image processing system). In other embodiments, the methods are performed by an imaging system having a processing unit (e.g. a microprocessor). Such imaging systems include, for example, a digital image or video capture device such as, for example, a digital camera, camcorder, electronic device with video capabilities, a computer vision system, a machine vision system (e.g. a barcode scanner) or other digital imaging system environment. The software application may run as a stand-alone digital video tool, an embedded function, or may be incorporated into other available digital image/video applications to provide enhanced functionality to those digital image/video applications. The software application may comprise program modules including routines, programs, object components, data structures etc. and may be embodied as computer readable program code stored on a computer readable medium. Examples of computer readable medium include for example read-only memory, random-access memory, CD-ROMS, magnetic tape and optical data storage devices. The computer readable program code can also be distributed over a network including coupled computer systems so that the computer readable program code is stored and executed in a distributed fashion. The present invention may be used for processing images from imaging devices including, but not limited to, digital cameras, mobile devices including smart phones and tablets, and other electronic devices having video capabilities. The present invention may also be used with optical imaging systems including, but not limited to computer vision systems, automatic vision systems, barcode readers, and surveillance security imaging systems.

Figure 2:
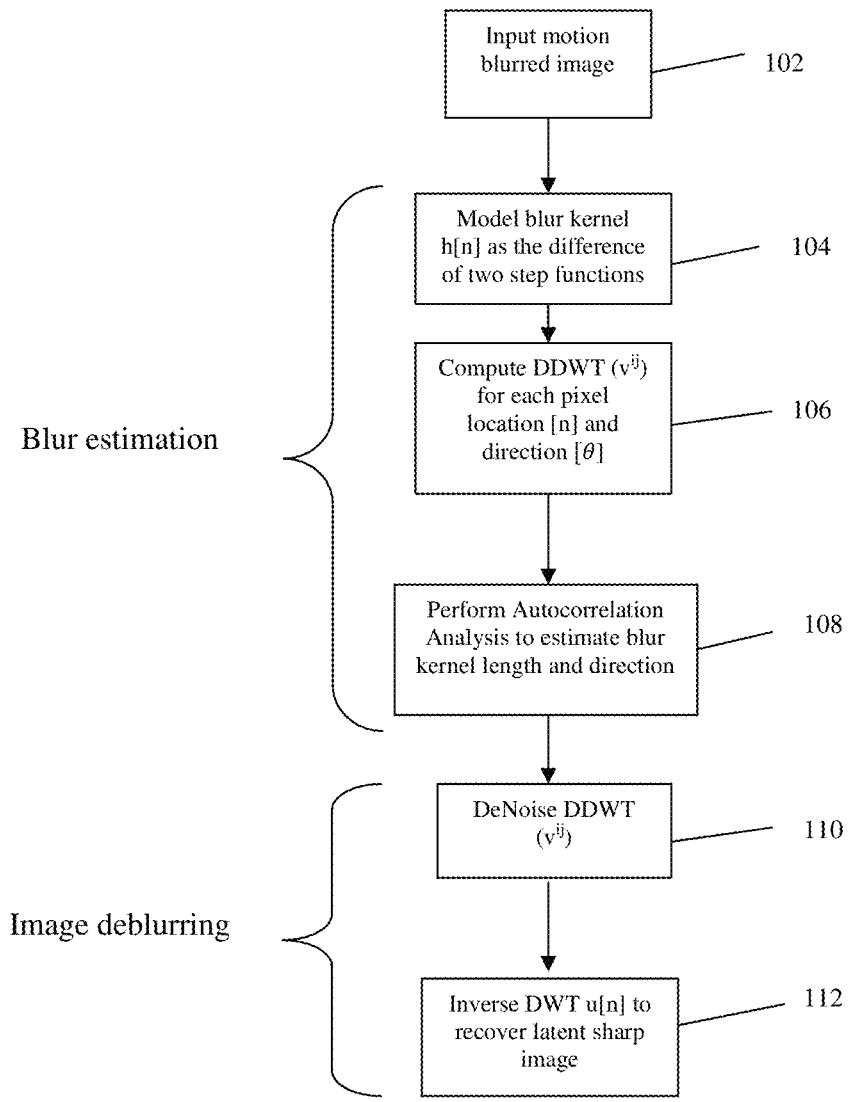
FIG. 2 shows an illustrative process for estimating a blur kernel and recovering a latent sharp image using a DDWT analysis for a motion blurred image.

The present invention utilizes both single discrete wavelet transforms (DWT) and a double discrete wavelet transform (DDWT) to analyze a captured image having blur. The transforms are defined to take an overcomplete (a.k.a. undecimated) form and be invertible. Referring now to the drawing figures, in which like numerals indicate like elements throughout the views, FIG. 2 illustrates an exemplary process 100 for analyzing a blurry image to estimate a blur kernel of the image. At step 102, an image is captured by an image capture device such as, for example, a digital camera, digital video camera, camcorder, or the like. When the image is captured, a signal is generated by the sensor array within the camera. This signal represents the pixel values corresponding to the captured image.

The captured image is analyzed using a DDWT analysis in order to sparsify both the captured blurry image and blur kernel simultaneously. For the analysis herein, $y: Z^2 \rightarrow R$ is defined as the captured image signal and $n \in Z^2$, and a wavelet analysis filter of jth subband is denoted by $d^j: Z^2 \rightarrow R$. Then $$w^j(n) := \{d^j \star y\}(n)$$

is the jth subband, nth location over-complete single discrete wavelet transform coefficient of an image y(n), where * denotes a convolution operator. The over-complete double discrete wavelet transform (DDWT) is defined by the relation:

$$v^{ij}(n) := \{d^i * w^j\}(n),$$

where $v^{ij}(n)$ is the transform coefficient of the image y(n) in the (i,j)th subband and location n.

In the special case that $d^j(n)$ is a one dimensional horizontal wavelet analysis filter and $d^i(n)$ is a vertical one dimensional wavelet analysis filter, then $v^{ij}(n)$ is an ordinary separable two dimensional wavelet transform. It is possible however for $d^j(n)$ and $d^i(n)$ to be arbitrarily defined (for example, both horizontal). The DWT and DDWT definitions for $w^j(n)$ and $v^{ij}(n)$ may apply to non-wavelet transforms $d^j$ and $d^i$, provided that the non-wavelet transforms are invertible.

DDWT Analysis of Blurred Image

With the single and double transform coefficients of the image y(n) determined, and assuming Lambertian reflectance, $x: Z^2 \rightarrow R$ is defined as the latent sharp image, $y: Z^2 \rightarrow R$ as the observed blurry image, and $n \in Z^2$ is the pixel location index. The observation y is assumed to be given by:

$$y(n) = \{x * h_n\}(n) + \epsilon(n) \qquad (1)$$
$$:= \sum_m x(n-m) h_n(m) + \epsilon(n),$$

where $\epsilon: Z^2 \rightarrow R$ is measurement noise. The point spread function $h_n: Z^2 \rightarrow R$ denotes a (possibly local) blur kernel acting at pixel location n, which may not be known a priori.

The blur kernel $h_n$ may take a box form in the case of horizontal motion, or a parametric form in the case of motion blur (by object speed and direction) or defocus blur (by aperture radius or depth). In order for the convolution model of equation (1) to hold, a Lambertian reflectance assumption is necessary, since objects may be observed from a different angle (e.g. as the camera or objects move). Although the degree of deviation of the non-Lambertian reflectance from the model of (1) depends on the properties of surface material (such as Fresnel constant), it is a common practice in the blur/deblur field to approximate the real world reflectance with equation (1). Where understood, the subscript n is omitted from $h_n(n)$ in the description herein.

When DDWT is applied to the observed image y, the corresponding DDWT coefficients $v^{ij}$ are related to the latent sharp image x and the blur kernel h by:

$$v^{ij}(n) = \{d^i * d^j * y\}(n) \quad (2)$$
$$= \{d^i * d^j * (\{h * x\} + \epsilon)\}(n)$$
$$= \{\{d^i * h\} * \{d^j * x\}(n) + \{d^i * d^j * \epsilon\}(n)$$
$$= \{q^i * u^j\}(n) + \eta^{ij}(n),$$

where $u^j := d^j * x$ and $q^i := *h$ are the DWT decompositions of x and h respectively; and $\eta^{ij} := d^i * d^j * h$ is noise in the DDWT domain. The relation between equations (2) and (3) is also illustrated in FIG. 3. In the above analysis, the wavelet analysis filter $d^i$ is preferably a Haar transform. The wavelet analysis filter $d^j$ may also be a Haar transform, or may be another type of wavelet transform, provided the selected transform is invertible. The wavelet transforms $d^i$ and $d^j$ are selected to provide optimum sparsification of the image.

Figure 3A:
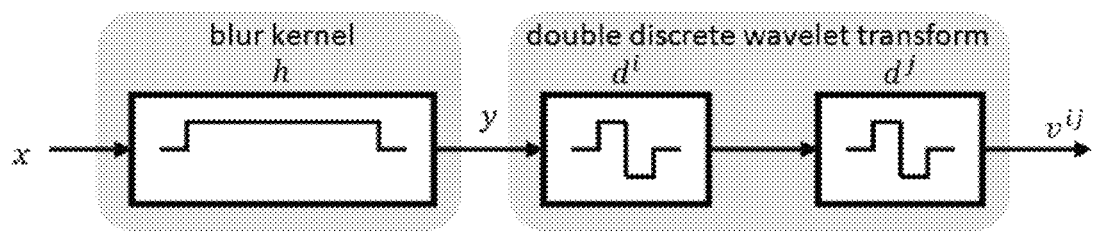
FIGS. 3(a) and 3(b) are diagrammatic views of equivalent processing pipelines for the DDWT analysis.
Figure 3B:
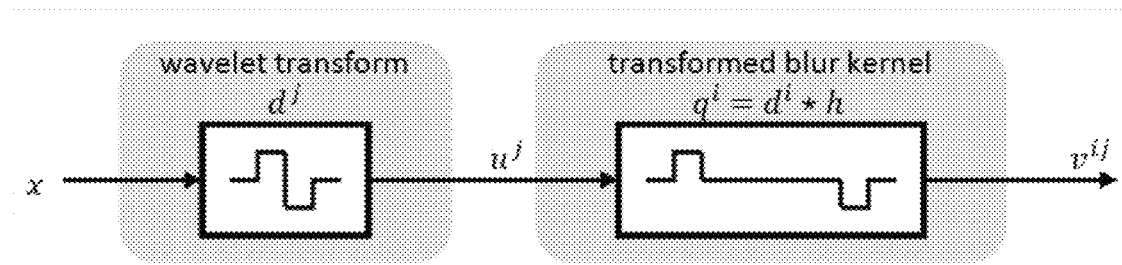

By the commutativity and associativity of convolution, the processes shown in FIGS. 3(a) and 3(b) are equivalent. The FIG. 3(a) process is the direct result of applying DDWT to the observed blurry image, while the process shown in FIG. 3(b) is the interpretation of the DDWT coefficients $u^j$ and $q^i$, though the process of FIG. 3(b) is not directly computable. Images captured by the color image sensor typically undergo demosaicking, which makes equation (1) approximate rather than exact. This approximation can be improved if using the demosaicking method described in: K. Hirakawa, X. Meng, and P. Wolfe. A framework for wavelet-based analysis and processing of color filter array images with applications to denoising and demosaicing. In Acoustics, Speech and Signal Processing, 2007. ICASSP 2007. IEEE International Conference on, volume 1, pages I-597. IEEE, 2007.

When $u^j$ and $q^i$ are sufficiently sparse, the DDWT coefficients is the result of applying a "sparse filter" $q^i$ to a "sparse signal" $u^j$. For a filter $q^i$ supported on $n \in \{n_1, \ldots n_K\}$, the result is:

$$v^{ij}(n) = \sum_{k=1}^{K} q^i(n_k) u^j(n - n_k). \quad (4)$$

When K is small, $v^{ij}$ is nothing more than a sum of K DWT coefficients $u^j$. The DWT decompositions have sparsified x and h, so that many of the $u^j$ values are already zeros, enabling $v^{ij}$ to actually be a sum of only a few (far less than K) DWT coefficients $u^j$. A DDWT coefficient is aliased if $v^{ij}$ is a sum of more than one "active" $u^j$ coefficient. The risk of aliasing can be reduced when the choice of $d^j$ and $d^i$ makes the coefficients $u^j$ and $q^i$ as sparse as possible. By symmetry, one may also interpret DDWT coefficients as $v^{ij} = \{q^j * u^i\} + \eta^{ij}$—this is equally valid. But in practice, the "confusion" between $(q^i, u^j)$ and $(q^j, u^i)$ does not seem to be a concern for algorithm development when $q^i$ is more sparse than $q^j$.

The recovery of $u^j$ from $v^{ij}$ provides for image deblurring, while reconstructing $q^i$ from $v^{ij}$ provides an estimation of the blur kernel h. Decoupling $u^j$ and $q^i$ can be easily computed if $v^{ij}$ is unaliased, and is reasonably uncomplicated when $u^j$ and $q^i$ are sufficiently sparse. The power of DDWT will be demonstrated in more detail in the following disclosure by analyzing specific blur types and example applications. Use of DDWT will be described in detail with respect to object motion blur processing. However, other blur types can also be analyzed in a similar manner using DDWT, with the details of the analysis being similar to the object motion blur processing. Where understood, the super scripts i and j are omitted from $v^{ij}$, $w^j$, $u^j$, and $q^i$.

Object Motion Blur—DDWT Analysis

Figure 4A:
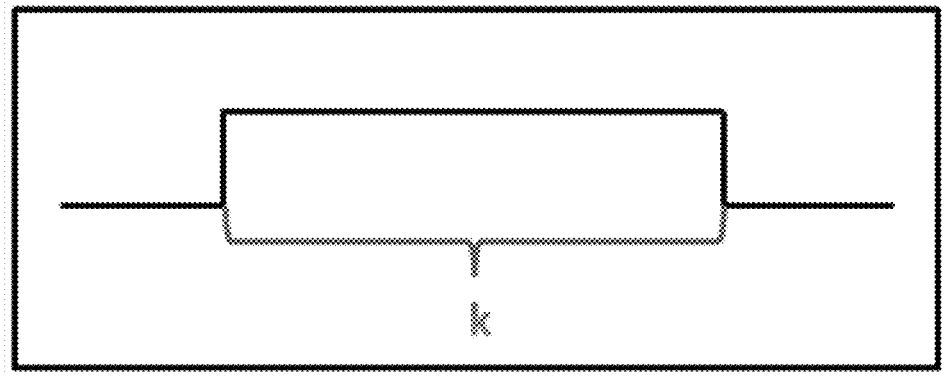
FIGS. 4(a) and 4(b) are diagrammatic representations of the blur kernel length as a step function (a) and an impulse function (b), 4(a) is the diagrammatic representation of the blur kernel as two step functions (this is sometimes called boxcar or pillbox) and 4(b) is the wavelet transformed version of 4(a), which results in a sum of two impulse functions.
Figure 4B:
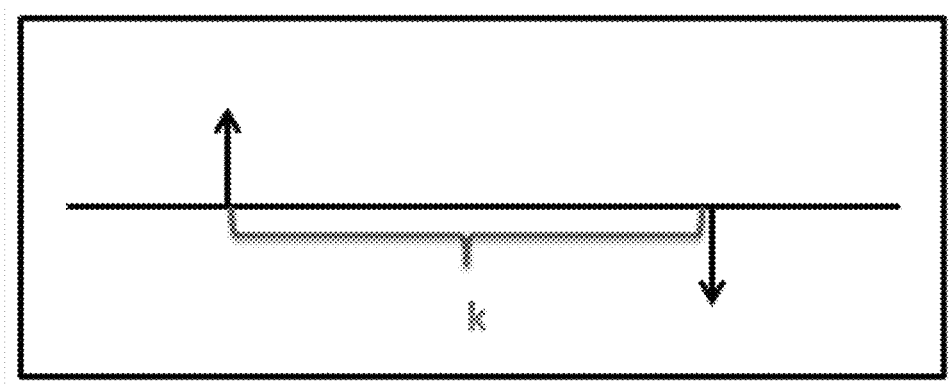

At step 104 of FIG. 2, the horizontal motion of the blur kernel is analyzed. Assuming constant velocity of a moving object during exposure, the blur kernel of the captured image can be modeled as:

$$h(n) = \frac{\text{step}\left(n + \binom{0}{k/2}\right) - \text{step}\left(n - \binom{0}{k/2}\right)}{k}, \quad (5)$$

as shown in FIG. 4(a), where k is the speed of the object. Letting $d^i$ denote a Haar wavelet transform [−1; 1], the DWT coefficient $q^i$ (from $q^i = d^i * h$) is the difference of two impulse functions:

$$q(n) = \frac{\delta\left(n + \binom{0}{k/2}\right) - \delta\left(n - \binom{0}{k/2}\right)}{k}. \quad (6)$$

shown in FIG. 4(b). Hence {q*u} is a "difference of two DWT coefficients" placed k pixels apart:

$$\{q * u\}(n) = \frac{u\left(n + \binom{0}{k/2}\right) - u\left(n - \binom{0}{k/2}\right)}{k}. \quad (7)$$

Figure 5:
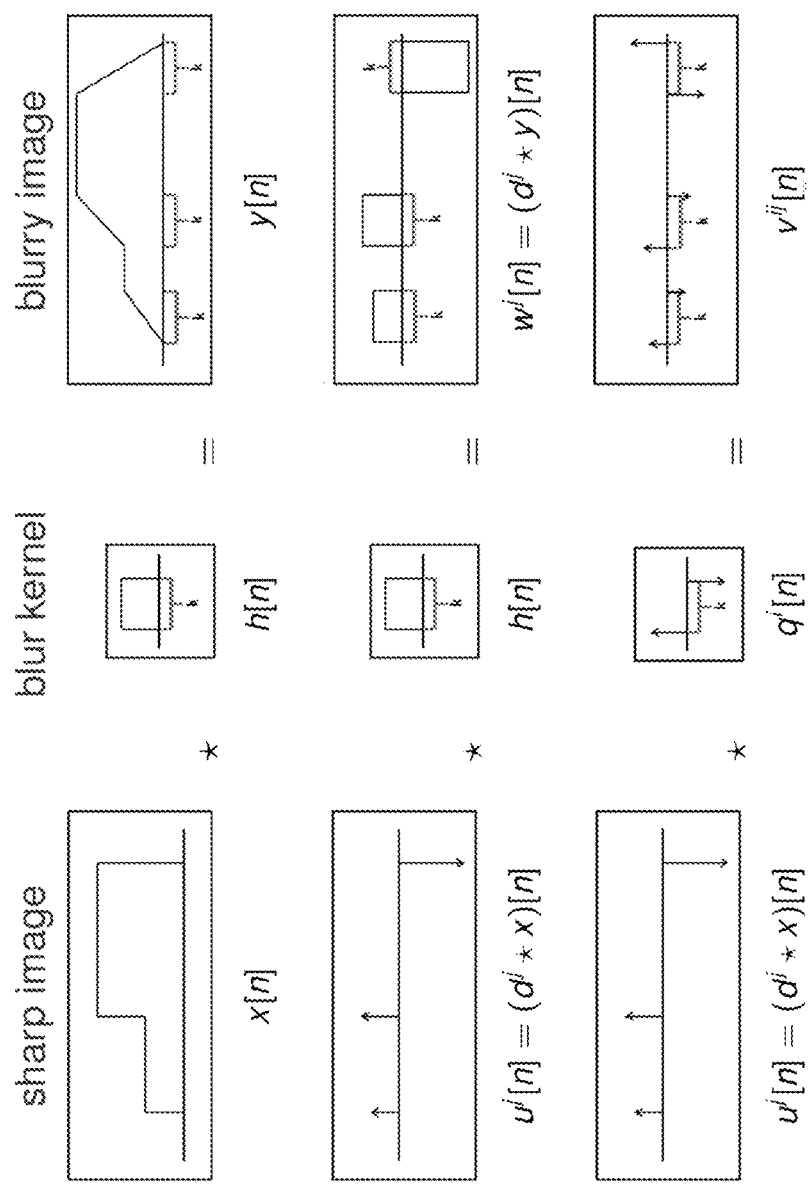
FIG. 5 is a diagrammatic representation depicting the estimation of the blur kernel length from the DDWT analysis of the blurry image.
Figure 6:
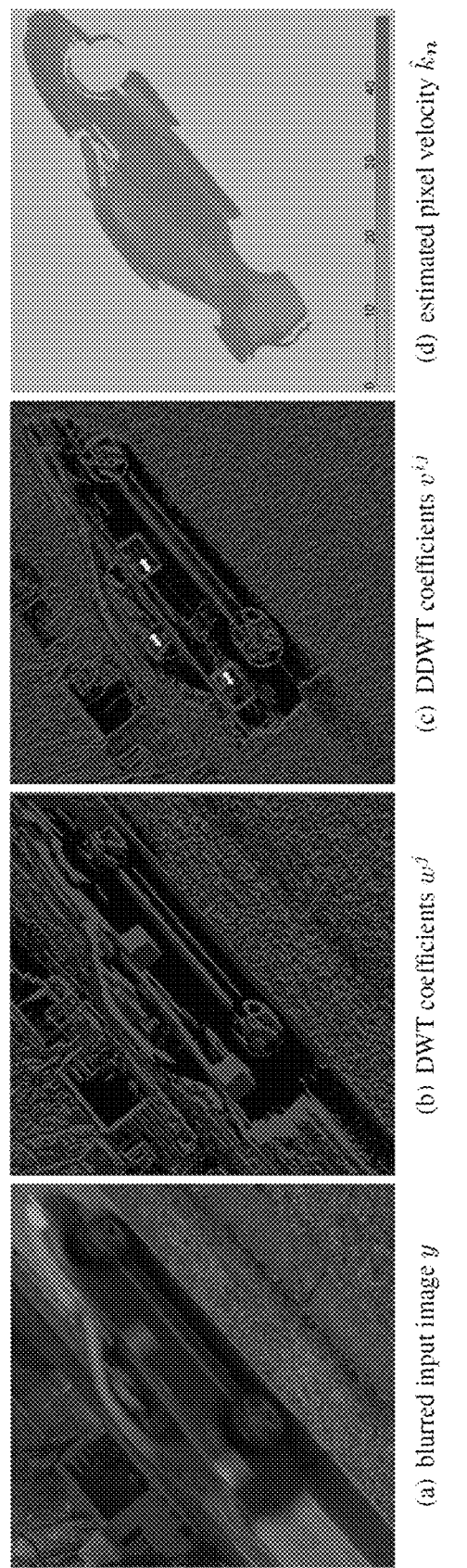
FIG. 6 depicts a series of images showing examples of DWT and DDWT coefficients using actual camera sensor data.

FIG. 5 provides a graphical illustration of the DDWT analysis, where the edges in the sharp image x[n] have been transformed through the analysis to pairs of impulse functions or arrows, with a spacing k between the members of each pair. The spacing k being the estimated length of the blur kernel. Coefficients u typically capture directional image features such as, for example, vertical edges. Therefore, the DDWT of moving objects yields "double edges" where the distance between the two edges corresponds exactly to the speed of the moving object. FIG. 6 shows an example of the "double edge" feature of DDWT coefficients. In FIG. 6, examples of the DWT and DDWT coefficients are shown using real camera sensor data. The motion blur manifests itself as a double edge, where the distance between the double edges (shown by the arrows in FIG. 6(c)) corresponds to the speed of the object. Average velocity of the moving pixels in FIG. 6(d) is 38 pixels, and the direction of motion is 40 degrees above the horizontal. Accordingly, using a DDWT analysis the detection of local object speed simplifies to the task of detecting these double edges. Deblurring the image using DDWT is equally straightforward in that the double edges in DDWT coefficients v are the copies of u.

Object Motion Detection

The human eye is well suited for the task of identifying replicated DWT coefficients u in DDWT coefficients v—in military applications, for example, a human "analyst" can easily detect complex motion (such as rotation) when presented with a picture of DDWT coefficients (such as FIG. 6(c)). For computational object motion detection, our ability to detect complex motion is limited primarily by the capabilities of the computer vision algorithms to extract local image features from DDWT, and find similar features that are located an unknown (k pixel) distance away. There are a number of ways that this can be accomplished. The correlation-based technique disclosed below is one exemplary way of detecting and extracting local image features in a DDWT analysis. Other image feature extraction methods may also be used with the DDWT analysis method of the invention without departing from the scope of the invention. A more advanced image feature extraction strategy than that disclosed herein, which is founded on computer vision principles, would likely improve the overall performance of the object motion detection.

As shown in step 108 of FIG. 2, and assuming that u in equation (7) above is wide sense stationary, a typical autocorrelation function is represented as:

$$R_u(\ell) := \mathbb{E} u\left(n - \begin{pmatrix} 0 \\ \ell/2 \end{pmatrix}\right) u\left(n + \begin{pmatrix} 0 \\ \ell/2 \end{pmatrix}\right)$$

Figure 7A:
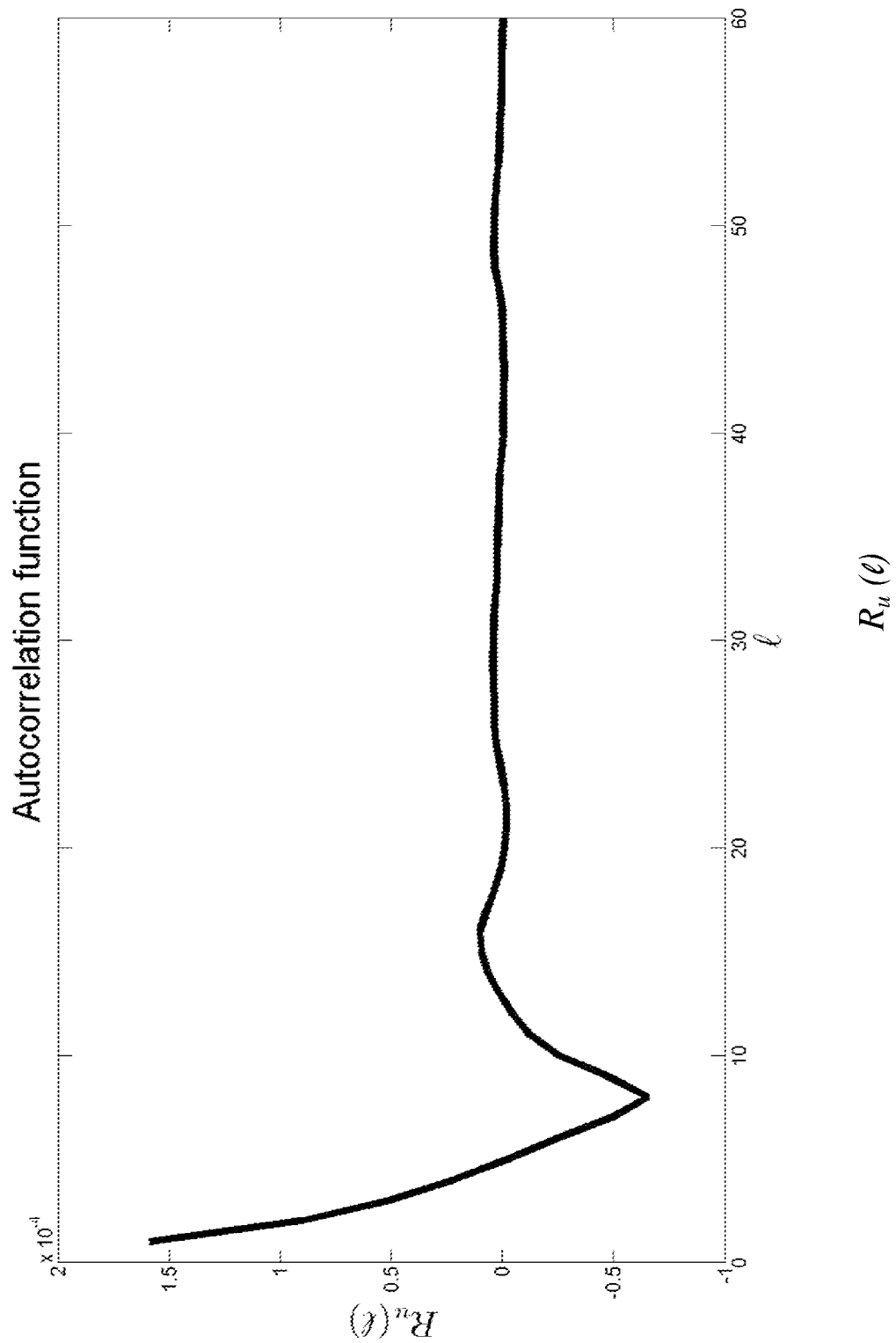
FIGS. 7(a)-(c) are graphical representations of the motion detection using autocorrelation analysis.

When $v(n)=u(n)+\eta(n)$ (i.e. no blur), then $$R_v(\ell) := \mathbb{E} v\left(n - \begin{pmatrix} 0 \\ \ell/2 \end{pmatrix}\right) v\left(n + \begin{pmatrix} 0 \\ \ell/2 \end{pmatrix}\right) = R_u(\ell) + R_\eta(\ell). \quad (8)$$

as shown in FIG. 7(a). On the other hand, in the presence of motion blur, $R_v(l)$ is a linear combination of $R_u(l)$ and $R_\eta(l)$:

$$R_v(l)=(2R_u(l)-R_u(l-k)-R_u(l+k))k^{-2}+R_\eta(l). \quad (9)$$

Figure 7B:
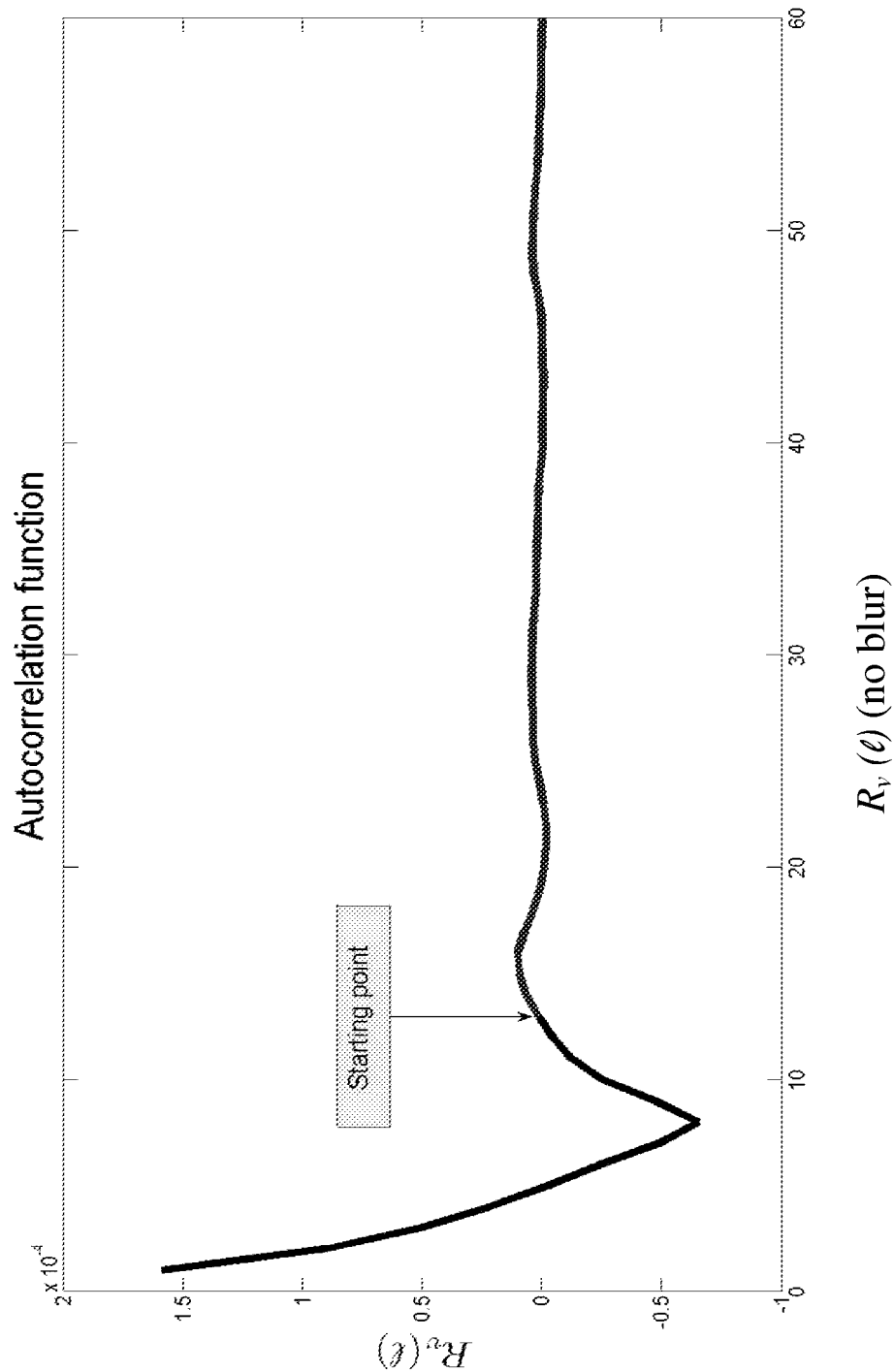
Figure 7C:
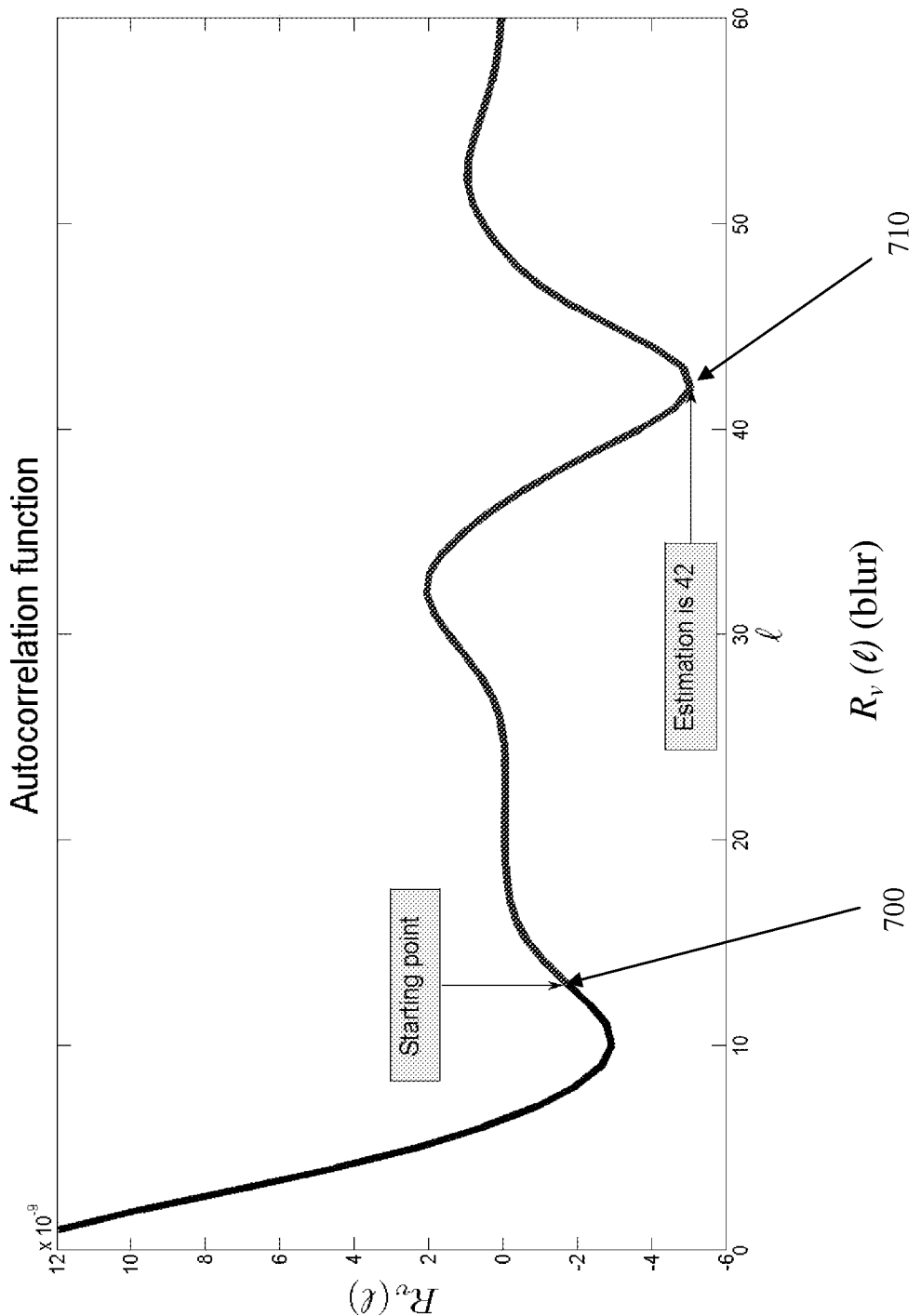

As illustrated in FIG. 7(b), the maximum of $R_v(l) \approx \sigma_u^2/k^2 + \sigma_\eta^2$ occurs at $l=0$. As indicated at step 108 of FIG. 2, the two minimums of $R_v(l)$ which coincide with the minimum of $R_u(l)$ and with $l=\pm k$ caused by the $R_u(l\pm k)$ are determined. The candidate l which produces the smallest secondary autocorrelation yields the estimation of the blur kernel length:

$$\hat{k} = \underset{\ell \geq L}{\arg\min} R_v(\ell) \quad (10)$$

where $l \in [L, \infty)$ is the candidate searching range (because the first minimum is expected to live in $l \in [0, L)$). As shown in FIG. 7(c) the starting point is 700 and the smallest secondary point providing the blur kernel estimation is indicated at 710. The autocorrelation function of (9) is essentially the indicator function for the double edges evidenced in FIG. 6(c).

To estimate the local object motion, autocorrelation needs to be localized also. The expectation operator in (8) can be approximated by a local weighted average $$R_v(n, \ell) \approx \frac{\sum_{m \in \Lambda} a(n+m, \ell) v\left(n+m+\begin{pmatrix} 0 \\ \ell/2 \end{pmatrix}\right) v\left(n+m-\begin{pmatrix} 0 \\ \ell/2 \end{pmatrix}\right)}{\sum_{m \in \Lambda} a(n+m, \ell)} \quad (11)$$

where $\Lambda$ defines the local neighborhood, n is the center pixel location, and $a(n, l)$ denotes the averaging weight at location n. Drawing on the principles of bilateral filtering, weights $a(n, l)$ promote averaging of $$v\left(n+m+\begin{pmatrix} 0 \\ \ell/2 \end{pmatrix}\right) v\left(n+m-\begin{pmatrix} 0 \\ \ell/2 \end{pmatrix}\right)$$

when $$y\left(n+m+\begin{pmatrix} 0 \\ \ell/2 \end{pmatrix}\right) \text{ and } y\left(n+m-\begin{pmatrix} 0 \\ \ell/2 \end{pmatrix}\right)$$

are similar to y(n); and limit contributions of the DDWT coefficient unlikely to be associated with the object at n.

Borrowing the idea of image simplification, the bilateral filtering on $R_v(n, l)$ can be repeated multiple times to yield a smoothed $R_v(n, l)$ that favors piecewise constant object motion speed over more complex ones.

To estimate the angle of the blur kernel for the non-horizontal/non-vertical motion, as indicated in step 108 of FIG. 2, image shearing is used to skew the input image y by an angle $\phi \in [0, \pi]$ (compared to image rotation, shearing avoids interpolation error). Denoting by $R_v(n, \phi, l)$ the autocorrelation function of v(n) in the sheared direction $\phi$, we detect the local blur angle $\theta$ and length k by:

$$(\hat{\theta}_n, \hat{k}_n) = \arg \min_{(\phi, \ell) \in [0,\pi] \times [L, \infty)} R_v(n, \phi, \ell). \quad (12)$$

FIG. 6(d) shows the result of estimating the angle $\theta$ and the length k of the blur at every pixel location, corresponding to the input image FIG. 6(a).

Object Motion Deblurring

Complementary to the detection of $q^i$ from $v^{ij}$ is the notion of recovering $u^j$ from $v^{ij}$. When an inverse DWT is applied to the recovered $u^j$, the reconstructed image is the latent sharp image x (i.e. deblurred image). Recall the relation in (3) and (7). Noise $\eta^{ij}$ in these operations can be accounted for by applying one of many standard wavelet shrinkage operators to the DDWT coefficients $v^{ij}$[11, 23, 15] as indicated at step 110 of FIG. 2. Such a procedure effectively removes noise $\eta^{ij}$ in $v^{ij}$ to yield a robust estimate $$\hat{v} \approx \{q^i * u^j\}(n) = k^{-1} \left\{ u\left(n + \begin{pmatrix} 0 \\ k/2 \end{pmatrix}\right) - u\left(n - \begin{pmatrix} 0 \\ k/2 \end{pmatrix}\right) \right\}$$

for low and moderate noise. Hence the main deblurring task is the estimation of u(n) from $\hat{v}(n)$.

A key insight exploited for deblurring is that denoised DDWT coefficients $$\hat{v}\left(n + \begin{pmatrix} 0 \\ k/2 \end{pmatrix}\right) \text{ and } \hat{v}\left(n - \begin{pmatrix} 0 \\ k/2 \end{pmatrix}\right)$$

share the same DWT coefficient u(n). But u(n) in $$\hat{v}\left(n + \begin{pmatrix} 0 \\ k/2 \end{pmatrix}\right)$$

may be contaminated by $$u\left(n + \begin{pmatrix} 0 \\ k \end{pmatrix}\right) \text{ and } u\left(n - \begin{pmatrix} 0 \\ k \end{pmatrix}\right)$$

respectively. It follows that DWT coefficients u of a natural image x are indeed sparse, and thus it is a rare event that contaminants $$u\left(n + \begin{pmatrix} 0 \\ k \end{pmatrix}\right) \text{ and } u\left(n - \begin{pmatrix} 0 \\ k \end{pmatrix}\right)$$

are both active at the same time. To this effect, we can claim the following result: (Robust Regression). Let:

$$\hat{v}(n) = u\left(n + \begin{pmatrix} 0 \\ k/2 \end{pmatrix}\right) - u\left(n - \begin{pmatrix} 0 \\ k/2 \end{pmatrix}\right).$$

Suppose further that the probability density function of u is symmetric (with zero mean), and $P[u(n)=0]=\rho$ (u is said to be "$\rho$-sparse"). Then:

$$P\left[u(n+k) = 0 \mid \left\|\hat{v}\left(n + \begin{pmatrix} 0 \\ k/2 \end{pmatrix}\right)\right\| < \left\|\hat{v}\left(n - \begin{pmatrix} 0 \\ k/2 \end{pmatrix}\right)\right\|\right] \geq \rho.$$

By the above claim, the following reconstruction scheme is "correct" with probability greater than $\rho$:

$$\hat{u}^j(n) = \begin{cases} k\hat{v}^{ij}\left(n + \begin{pmatrix} 0 \\ k/2 \end{pmatrix}\right) & \text{if } \left\|\hat{v}\left(n + \begin{pmatrix} 0 \\ k/2 \end{pmatrix}\right)\right\| < \left\|\hat{v}\left(n - \begin{pmatrix} 0 \\ k/2 \end{pmatrix}\right)\right\| \\ k\hat{v}^{ij}\left(n - \begin{pmatrix} 0 \\ k/2 \end{pmatrix}\right) & \text{otherwise.} \end{cases} \quad (13)$$

Since this deblurring scheme improves if $P[u(n)=0]=\rho\approx 1$ (i.e. more sparse), the choice of sparsifying transform $d^j$ is the determining factor for the effectiveness of the DDWT-based blur processing. After determining the sharp wavelet coefficients u[n], the inverse discrete wavelet transform can be performed to recover the sharp latent image x[n], as indicated at step 112 of FIG. 2.

Figure 8:
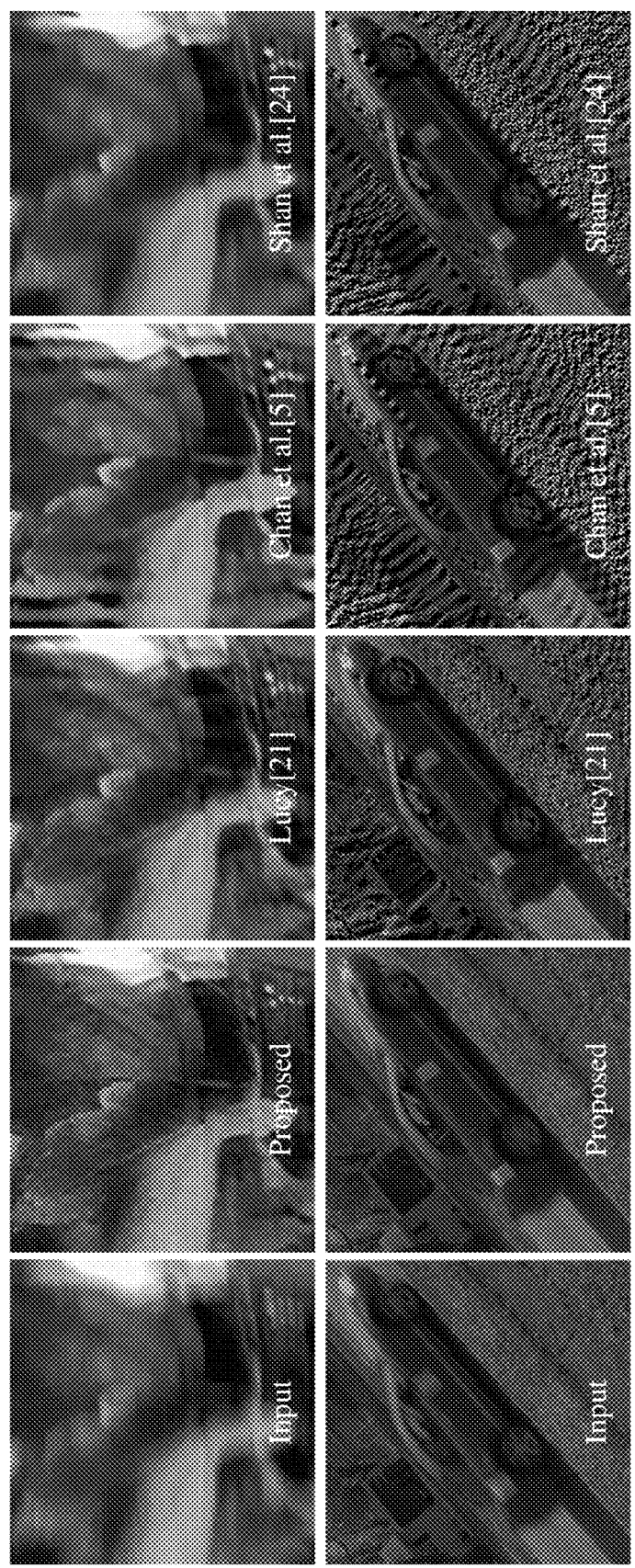
FIG. 8 depicts a series of images comparing motion deblurring using DDWT (labeled "Proposed" with other known methods of motion deblurring.

Among the notable features of the above-described deblurring scheme is first that the recovery of $u^j$ in (13) is simple and works regardless of whether the blur kernel is global or spatially varying (simply replace k with $k_n$ in the case of a spatially varying blur kernel). Second, the deblurring technique in (13) is a single-pass method. The single-pass method greatly decreases processing time compared to the overwhelming majority of existing deconvolution techniques that require iteration. Third, owing to the fact that no DDWT coefficient v(n) can influence the reconstruction of the DWT coefficient u(n) that is more than $$\begin{pmatrix} 0 \\ k/2 \end{pmatrix}$$

pixels away, the proposed method is not prone to ringing artifacts. Finally, one can easily incorporate any wavelet domain denoising scheme into the design of the deblurring algorithm. Reconstructions using real camera sensor data in FIG. 8 show the superiority of the disclosed DDWT approach as compared to the methods disclosed in: [21] L. Lucy. Bayesian-based iterative method of image restoration. Journal of Astronomy, 79(745-754), 1974; [5] S. Chan, R. Khoshabeh, K. Gibson, P. Gill, and T. Nguyen. An augmented Lagrangian method for total variation video restoration. Image Processing, IEEE Transactions on, 20(11):3097-3111, 2011; and [24] Q. Shan, J. Jia, and A. Agarwala. High-quality motion deblurring from a single image. ACM Transactions on Graphics (SIGGRAPH), 2008.

Optical Defocus Blur

Figure 9A:
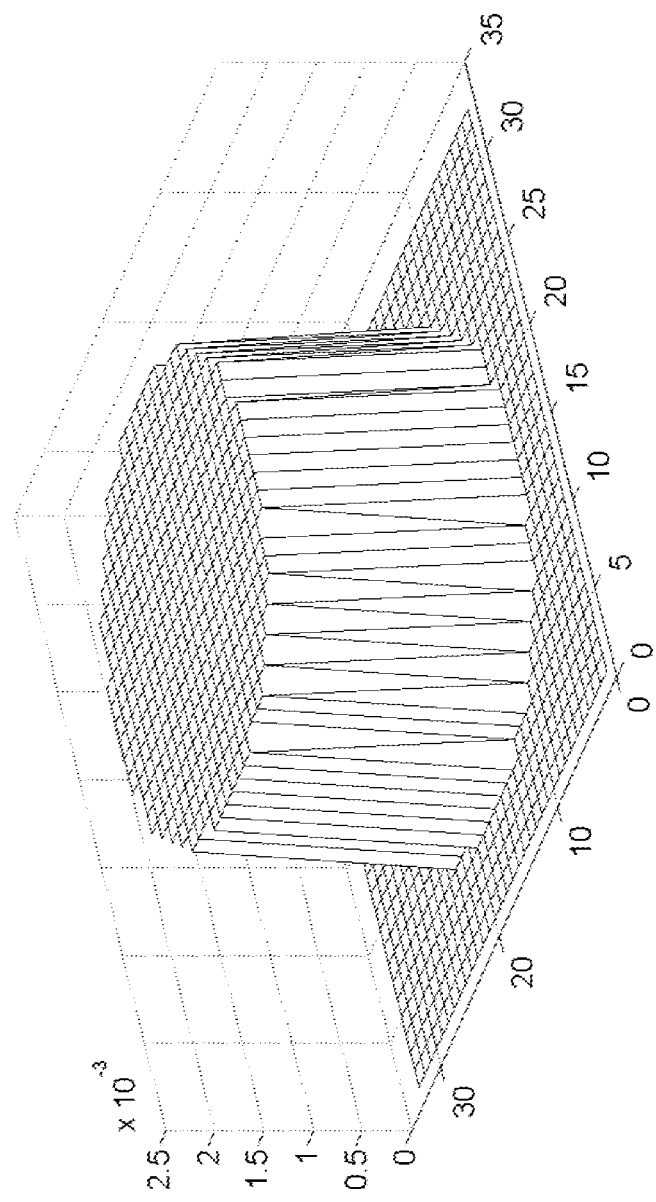
FIGS. 9(a)-9(c) depict an exemplary blur kernel, wavelet coefficient and autocorrelation function for a defocus blur.

The DDWT analysis described above can be extended to defocus blur in order to recover the latent sharp image x. While the motion blur kernel as described above had a box shape, the support of the defocus blur kernel takes the shape of the aperture opening, which is a circular disk in most typical cameras (supp{h}={n: $\|n\| \leq r$} where r is the radius of the disk). The defocus blur analysis is a two dimensional analysis depicted in the flow diagram of FIG. 14 and described with respect to FIGS. 9(a)-9(c). The defocus blurred image is input to the processor, and the DDWT ($v^{ij}$) is computed as shown in steps 302 and 304. As shown in step 306, an autocorrelation is computed for each blur kernel candidate radius. A second autocorrelation is then performed, as shown at step 308, to estimate the blur kernel radius at each location [n]. Though the blur kernel h(n), illustrated in FIG. 9(a) may not be known exactly, consider the following approximation:

$$h(n) \approx \begin{cases} \frac{1}{\pi r^2} & \text{if } \|n\| \leq r \\ 0 & \text{otherwise.} \end{cases} \quad (14)$$

Letting $d^i$ denote a Haar wavelet transform [−1, 1], the corresponding sparse blur kernel $q^i$ is:

$$q^i(n) \approx \begin{cases} \frac{1}{\pi r^2} & \text{if } \|n\| = r \text{ and } n_2 > 0 \\ \frac{-1}{\pi r^2} & \text{if } \|n\| = r \text{ and } n_2 < 0 \\ 0 & \text{otherwise.} \end{cases} \quad (15)$$

Figure 9B:
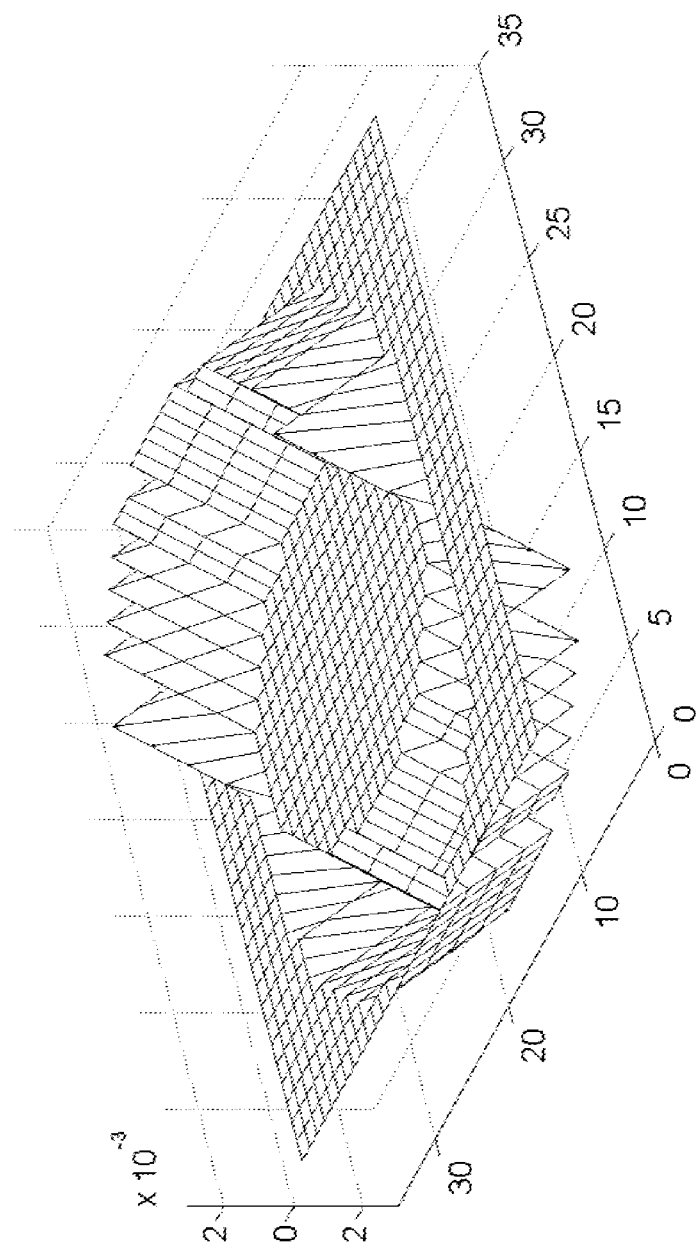

A sparse blur kernel $q^i$ is depicted in FIG. 9(b). The crude approximation in (14) is acceptable for DDWT-based blur processing—with the discontinuities at the disk boundary and smoothness of h(n) inside the disk, the sparse blur kernel $q^i$ is similar to (15).

Drawing parallels between (15) and (6), the DDWT-based processing of optical defocus blur requires only minor modifications to (12) and (13). For detection, one would redefine the autocorrelation function to integrate over the circumference of the circle in (14):

$$R_v(n, s) = \frac{\mathbb{E}\int_{-\pi/2}^{\pi/2} v\left(n - s\begin{pmatrix} \cos(\theta) \\ \sin(\theta) \end{pmatrix}\right) v\left(n + s\begin{pmatrix} \cos(\theta) \\ \sin(\theta) \end{pmatrix}\right) d\theta}{s}$$

Figure 9C:
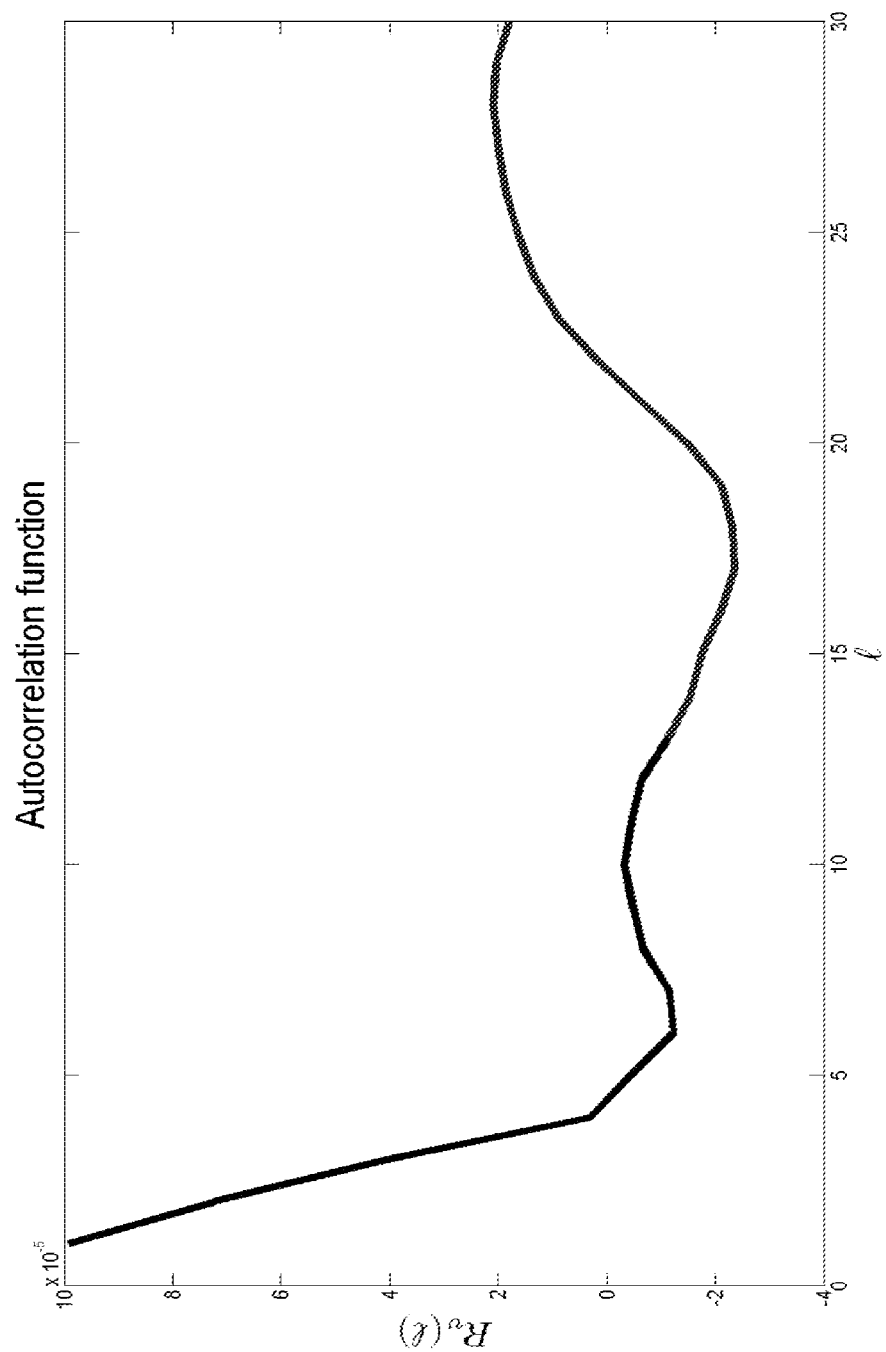
Figure 10:
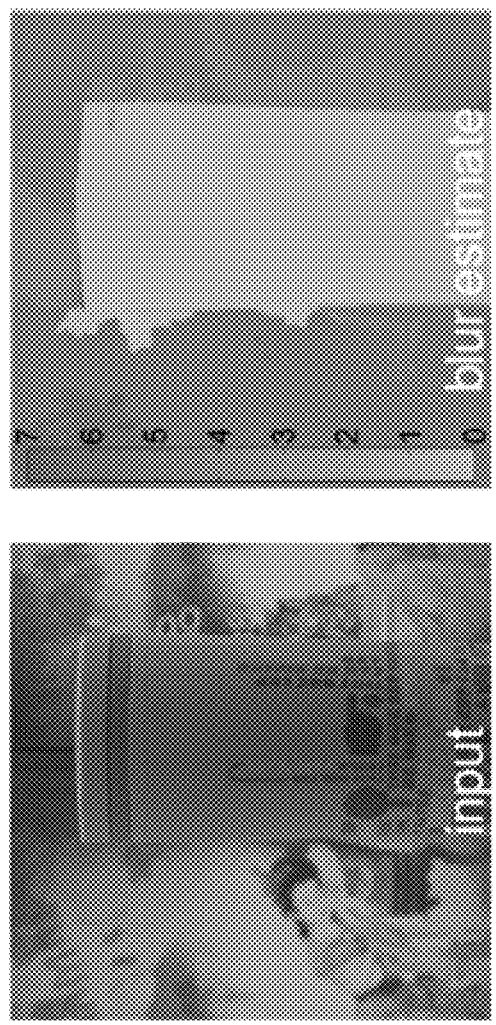
FIGS. 10(a) and 10(b) depict a captured blurry image and blur estimate for a defocus blur.

The estimated defocus blur radius is given by $$\hat{r}_n = \underset{s \geq S}{\operatorname{argmin}} R_v(n, s)$$

where $s \in [s, \infty)$ is the candidate search range. The modified autocorrelation function for defocus blur is shown in FIG. 9(c), where the second minimum corresponds to the detected blur radius. The detected blur radius corresponds to the speed or distance of the object and provides useful information regarding the position of an object. FIG. 10(b) shows the estimation of defocus blur radius $r_n$ at every location, corresponding to the input shown in FIG. 10(*a*).

Following denoising of DDWT at step 310, the latent wavelet coefficient $u^j$ is recovered for deblurring, as shown in step 312, by comparing $$\hat{v}^{ij}\left(n - r\begin{pmatrix}\cos(\theta)\\\sin(\theta)\end{pmatrix}\right) \text{ and } \hat{v}^{ij}\left(n + r\begin{pmatrix}\cos(\theta)\\\sin(\theta)\end{pmatrix}\right)$$

It is an unlikely event that both are aliased. As such, $$\hat{u}^j(n,\theta) = \pi r^2\left[\beta(n,\theta)\hat{v}^{ij}\left(n - r\begin{pmatrix}\cos(\theta)\\\sin(\theta)\end{pmatrix}\right) - (1 - \beta(n,\theta))\hat{v}^{ij}\left(n + r\begin{pmatrix}\cos(\theta)\\\sin(\theta)\end{pmatrix}\right)\right]$$

$$\beta(n,\theta) = \frac{\left|\hat{v}^{ij}\left(n + r\begin{pmatrix}\cos(\theta)\\\sin(\theta)\end{pmatrix}\right)\right|}{\left|\hat{v}^{ij}\left(n - r\begin{pmatrix}\cos(\theta)\\\sin(\theta)\end{pmatrix}\right)\right| + \left|\hat{v}^{ij}\left(n + r\begin{pmatrix}\cos(\theta)\\\sin(\theta)\end{pmatrix}\right)\right|}$$

is a possible reconstruction of u based on a pair of DDWT coefficients. The final deblurring result is obtained by marginalizing out $\theta$:

$$\hat{u}^j(n) = (\int_{-\pi/2}^{\pi/2} \hat{u}^j(n,\theta)d\theta)(\pi r)^{-1}. \quad (16)$$

and performing an inverse DWT to recover the latent sharp image, as shown at step 314. Processing an optical defocus blur using DDWT provides the opportunity for auto focusing and motion estimation. Calculating the blur radius and using the blur radius to determine the difference between the captured image and sharp image provides opportunities for a faster, more efficient auto focus feature. By calculating the defocus blur radius using the described method, an imaging device can be auto focused in a single step, as opposed to the current slower, more computation intensive scanning focus sweeps.

Figure 11:
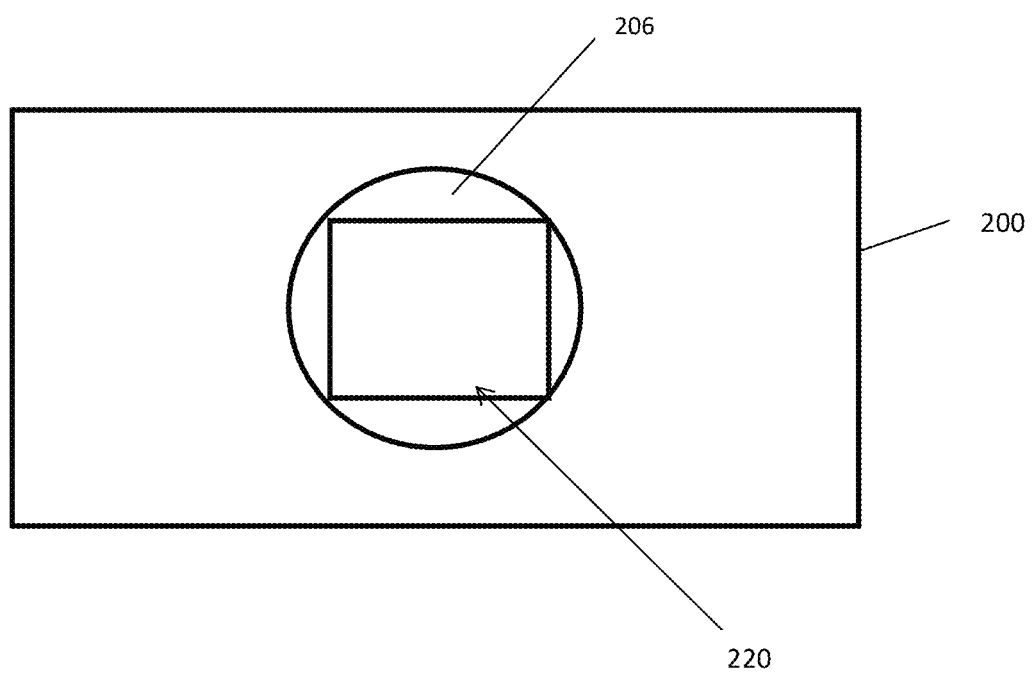
FIG. 11 is a simplified diagrammatic view of an imaging device with a square aperture mask.
Figure 13:
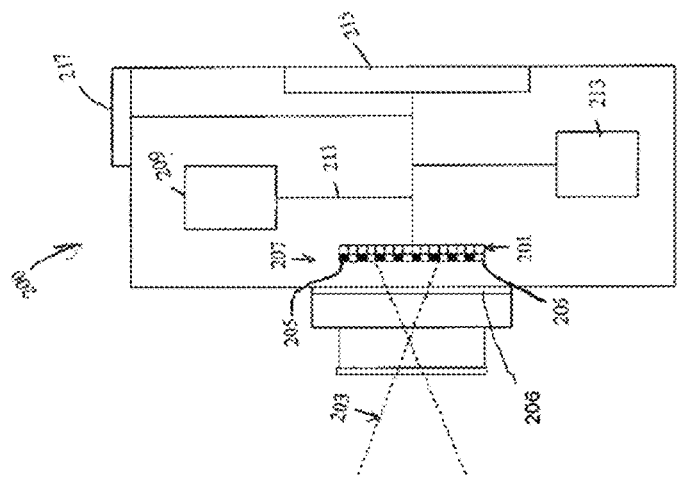
FIG. 13 depicts a schematic illustration of a digital camera which includes a processor programmed to perform the method of the present invention.
Figure 15A:
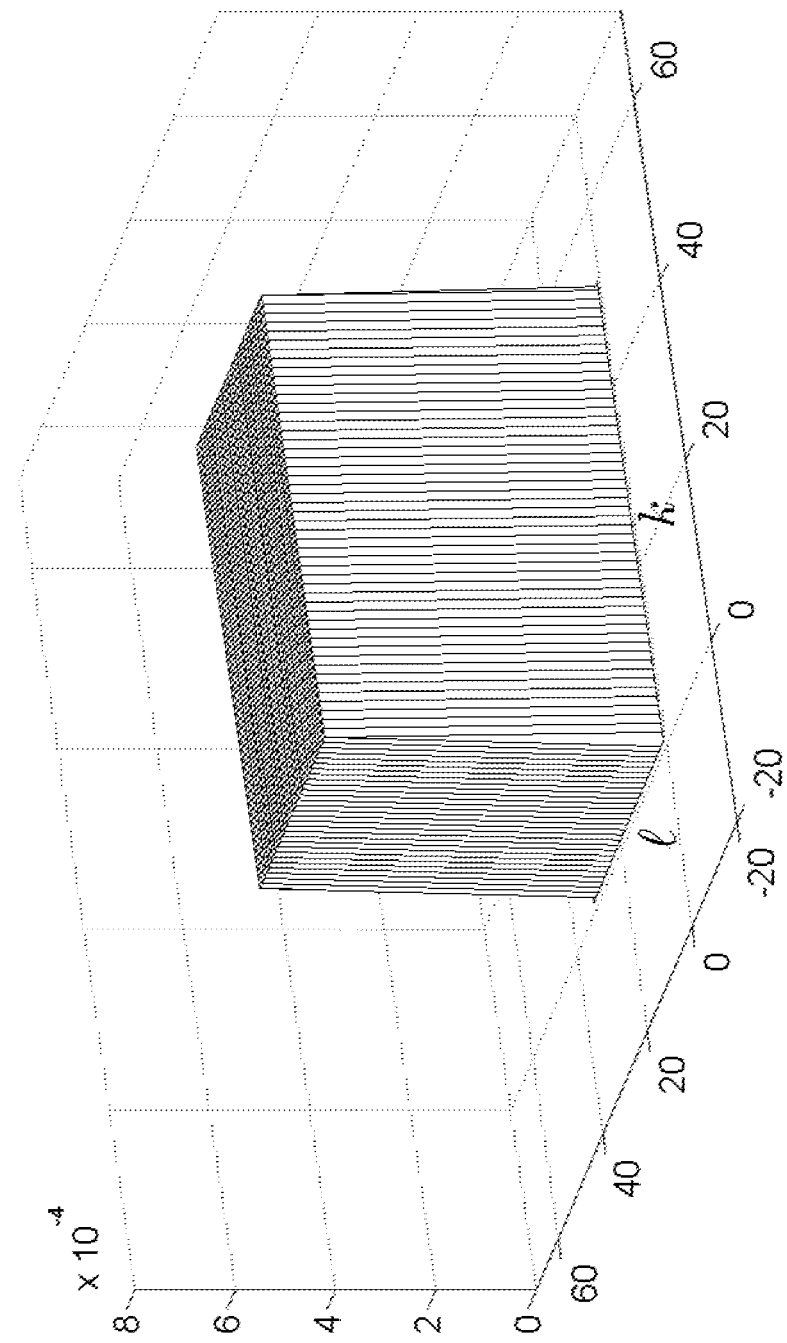
FIG. 15(a) depicts an exemplary blur kernel for the imaging device with square mask shown in FIG. 11.
Figure 15B:
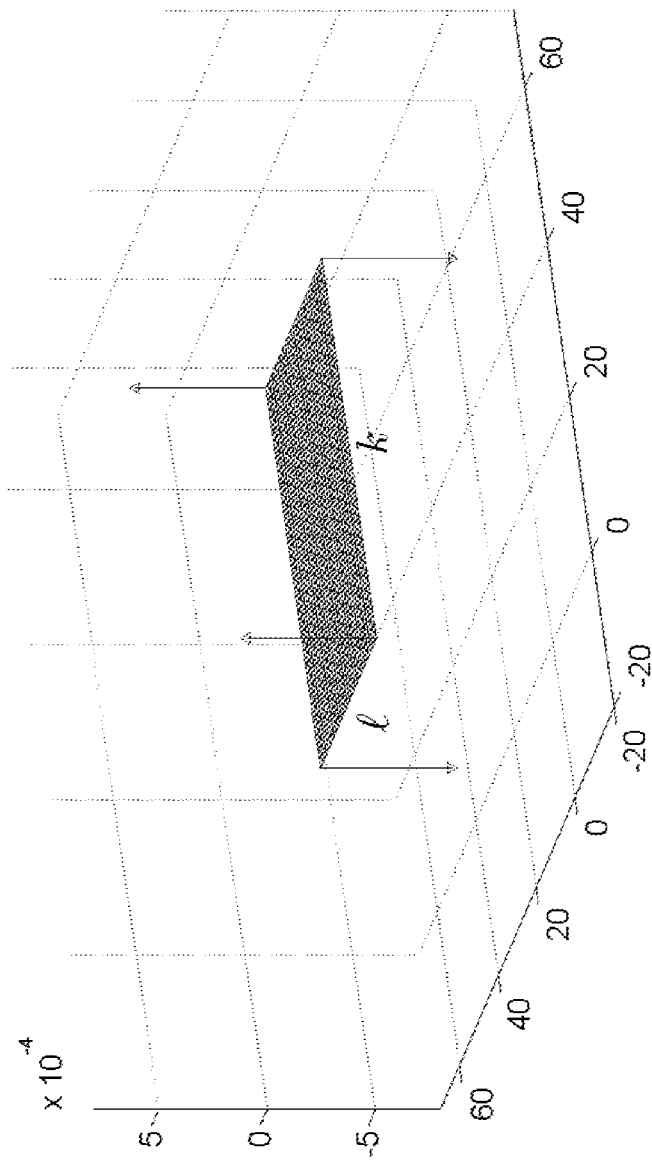
FIG. 15(b) is the wavelet transform of the blur kernel shown in FIG. 15(a).

To further improve the quality of the recovered sharp image, a mask can be placed within the sight path of the imaging device between a scene to be captured and the pixel array sensor in order to alter the pattern of light directed onto the pixel array of the device. The mask can be placed in front of, behind or within the lens system (e.g. between two or more lenses or lens elements), provided the mask is positioned to impact the light before striking the pixel array sensors. The mask alters the shape of the blur kernel of the captured image, producing a blur kernel such as shown in FIG. 15(*a*). A number of different, and often random patterns, have been utilized for aperture masks also known as coded apertures. However, when combined with a Haar wavelet transform, it has been determined that a square or rectangular aperture produces the most simplified image, thereby providing the best recovery of the latent sharp image. FIG. 11 shows an exemplary image capturing device 200 having a lens. A mask 206 having a rectangular or square-shaped opening or aperture 220 is shown placed over the front of the lens in order to change the light pattern going into the lens. The mask could also be placed behind the lens as shown in FIG. 13, or at another location within the light path in order to affect the light pattern prior to impinging upon the sensor array. It is also contemplated that the mask may comprise an aperture mechanism in a camera or other imaging device wherein the typical circular aperture mechanism is replaced by a square or rectangular aperture mechanism.

The convolution of the captured image resulting from the square or rectangular openings in mask 220 with a Haar transform (in the diagonal direction a the finest level) sparsifies the image even further than can be obtained using the approximately circular defocus blur analysis described above. Using a rectangular or square-shaped opening in the mask produces a simplified rectangular wavelet coefficient having only four active points located at the corners of the transformed blur kernel, as shown in FIG. 15(*b*), rather than the expanded shape shown in FIG. 9(*b*). In this case, the four active points is more similar to the Haar wavelet transformed motion blur illustrated in FIG. 4(*b*), which has only two active coefficients.

Image Recognition

Blur interferes with recognition tasks, as feature extraction from a blurry image is a real challenge. For example, a license plate shown in FIG. 12(*a*) is blurred by the motion of the car. As evidenced by FIG. 12(*b*), edge detection fails to yield meaningful features because the image lacks sharp transitions. Character recognition on FIG. 12(*b*) would also likely fail, not only due to degraded image quality but also because letters are elongated in the horizontal direction by an arbitrary amount. One method of improving character recognition is to deblur the image as a pre-processing step to the computer vision algorithms.

Figure 12:
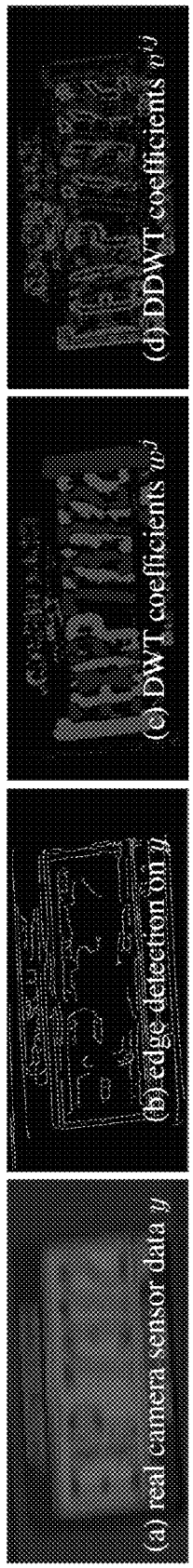
FIGS. 12(a)-12(d) depict a series of images depicting feature extraction using DDWT.

Specifically, consider DWT and DDWT of input image y, shown in FIGS. 12(*c*) and 12(*d*). Though the conventional interpretation of FIG. 12(*c*) is that this is a wavelet decomposition of an image, one can equally understand this as a sparse filter applied to a sharp image, as follows:

$$w^j(n) := \{q^j \star x\}(n) + \{d^j \star \epsilon\}(n).$$

If a Haar wavelet transform [−1; 1] is used for $d^j$, the above result reduces to a difference of latent sharp image $$w^j(n) := x\left(n + \begin{pmatrix}0\\k/2\end{pmatrix}\right) - x\left(n - \begin{pmatrix}0\\k/2\end{pmatrix}\right) + \{d^j \ast \epsilon\}(n).$$

Hence the characteristics of the latent image x are well preserved in DWT coefficients $w^j$. Indeed, the characters in FIG. 12(*c*) are more readable—their appearance is sharp with strong edges, and they have not been elongated in the direction of the motion. However, each character appears twice (two 7's, etc.), so a character recognition on $w^j$ would require a post-processing step to prevent double counting of detected characters. The DDWT shown in FIG. 12(*d*) essentially performs edge detection on FIG. 12(*c*). Comparing FIGS. 12(*b*) and 12(*d*) show that computing the sensor data y with a DDWT provides superior edge detection. Note that it was not necessary to detect the blur kernel prior to producing the sharper images of FIGS. 12(*c*) and (*d*). An edge recognizing computer algorithm can be applied to the DDWT coefficient $v^{ij}$ image to detect the motion artifacts in the image and perform character recognition. The above analysis raises the possibility of carrying out recognition tasks on blurry images without image deblurring. DWT and DDWT are near-blur-invariant representations of the latent image x, and computer vision algorithms can be trained to work with them directly. The detection of motion artifacts using DDWT without the need to first deblur the image can be applied in bar code scanners to improve detection and reduce the scanning speed.

Figure 14:
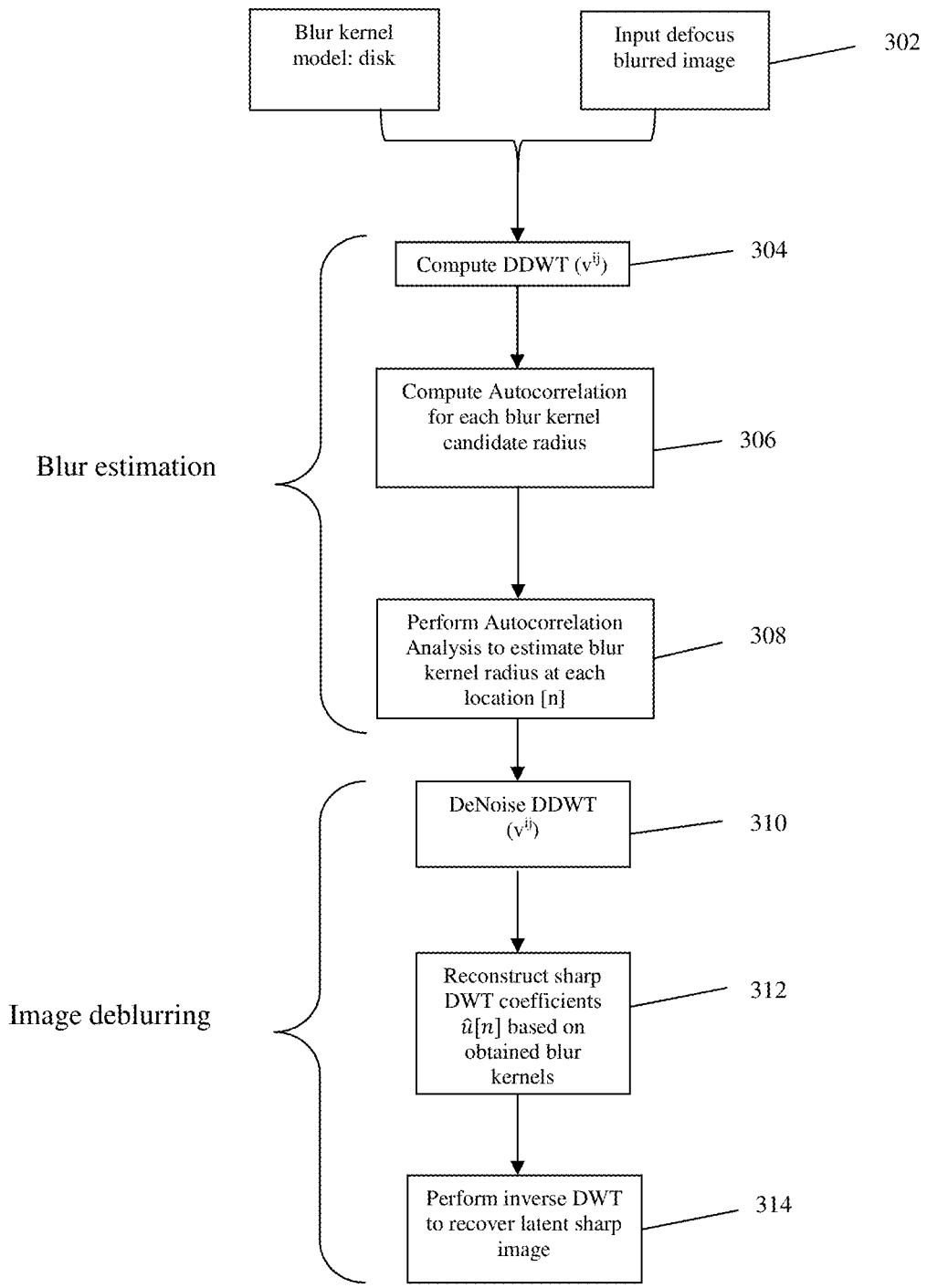
FIG. 14 shows an illustrative process for estimating a blur kernel and recovering a latent sharp image using a DDWT analysis for a defocus blurred image.

FIG. 14 provides a high level schematic block diagram of a generalized image capturing device 200 for capturing a blurred image signal for processing according to the invention. As shown in FIG. 14, such an imaging device will generally include a plurality of light sensitive elements 201 (pixel sensor elements). Each light sensitive element is configured to measure a magnitude of light 203 corresponding to a location within an image being captured. Light 203 passes through a mask 206 (if used) and through the lens.

The plurality of light sensitive elements 201 may include a plurality of photo sensitive capacitors of a charge-coupled device (CCD). Alternatively, the plurality of light sensitive elements 201 may include one or more complementary metal-oxide-semiconductors (CMOS). During image capture, each photosensitive capacitor may be exposed to light 203 for a desired period of time, thereby generating an electric charge proportional to a magnitude of the light at a corresponding image location. After the desired period of time, the electric charges of each of the photosensitive capacitors may be measured to determine the corresponding magnitudes of light at each image location in order to generate RAW pixel data for the image.

A color filter array 205 may be positioned over the pixel sensor array 201 and disposed on one or more of the light sensitive elements 201. The current in each photosensitive capacitor is measured and converted into a signal that is transmitted from the CCD to the processor 209. The processor 209 can include a general purpose microprocessor and/or an application specific integrated circuit (ASIC) and/or a field programmable gate array(s). In some embodiments, the processor 209 is part of a general purpose computer or other computing device.

In some embodiments, the processor 209 is coupled to a communication network 211 (e.g., a bus, the Internet, a LAN). In some embodiments, one or more storage components 213, a display component 215, a network interface component (not shown), a user interface component 217, and/or any other desired component are coupled to the communication network 211 and communicate with the processor 209. In some implementations, the storage components 213 include nonvolatile storage components (e.g., memory cards, hard drives, ROM) and/or volatile memory (e.g., RAM). In some implementations, the storage components 213 are used to store mosaiced and/or demosaiced representations of images captured using the light sensitive elements 201.

Processor 209 is configured to perform a plurality of processing functions, such as responding to user input, processing image data from the photosensitive elements 201, and/or controlling the storage and display elements 213, 215. In particular, one or more such processors 209 are configured to perform the image data processing functions described above. In some embodiments, the image capturing device 200 comprises a video camera configured to capture representations of a series of images. In addition to or as an alternative to capturing a representation of a single image, as described above, such a video camera may capture a plurality of representations of a plurality of images over time. The plurality of representations may comprise a video. The video may be stored on a machine readable medium in any format, such as a MPEG or any other electronic file format.

The embodiments described provide methods of using a double discrete wavelet transform as an analytical tool in image blur processing. Applying a DDWT analysis to the captured image enables the latent sharp image and blur kernel to be sparsified simultaneously. A sparse representation is key to decoupling the blur and image signals, enabling blur kernel recovery and deblurring to occur in the wavelet domain. Using the DDWT analysis provides accurate estimates of the length and angle of the motion blur kernel. Additionally, the DDWT analysis disclosed herein inspires a new generation of blur-tolerant recognition tasks aimed at exploiting the near-blur-invariant properties of DDWT coefficients. Potential applications of DDWT include object velocity and defocus blur estimation, which are useful for making inferences on object activities or depths. Additionally, image deblurring using the DDWT process disclosed herein enables the extraction of near blur invariant image features, providing new and improved opportunities for feature extraction and computer vision.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method of processing a motion blurred image to generate blur kernel data for each pixel of the image, the method comprising:
    (a) capturing a motion blurred image signal through an imaging device;
    (b) generating, by a processor, a double discrete wavelet transform signal by computing a two-dimensional double discrete wavelet transform of the motion blurred image signal;
    (c) using the double discrete wavelet transform signal to perform a first autocorrelation analysis to estimate the blur kernel; and
    (d) using the blur kernel estimate to perform a local autocorrelation analysis to generate a blur kernel length and direction for each pixel of the motion blurred image.

2. The method of claim 1, wherein after determining the blur kernel length and direction, the method further comprises the step of:
    (e) denoising the double discrete wavelet transform signal;
    (f) reconstructing discrete wavelet transform coefficients for a latent sharp image corresponding to the motion blurred image using the blur kernel length and direction; and
    (g) performing an inverse discrete wavelet transform of the discrete wavelet transform coefficients to generate the latent sharp image recovered from the motion blurred image.

3. An imaging device configured to capture and process image data in accordance with the method of claim 1.

4. A method of analyzing a motion blur in an image of a scene captured through an imaging device in order to produce transform coefficients of the captured image, the method comprising the steps of:
    (a) receiving a motion blurred image signal corresponding to the captured image scene;
    (b) computing a double discrete wavelet transform of the image signal to produce transform coefficients of the image signal by
        performing a convolution of the image signal with a first wavelet analysis filter to produce a single discrete wavelet transform coefficient of the image signal; and
        performing a convolution of the single discrete wavelet transform coefficient with a second wavelet analysis filter to produce double discrete wavelet transform coefficients for the image signal;
    wherein the transform coefficients of the image signal include a sparsified signal of a blur kernel and a sparsified signal of a latent sharp image.

5. The method of claim 4, wherein the first and second wavelet analysis filters are Haar wavelet transforms.

6. The method of claim 4, further comprising the step of determining a length and direction of the motion blur.

7. The method of claim 4, further comprising the step of detecting one or more pairs of double edges in the double discrete wavelet transform coefficients of the image signal, and using the detected double edge pairs to detect one or more features in the captured image.

8. The method of claim 6, wherein the step of determining the length and direction of the motion blur further comprises calculating the distance between at least one impulse pair of the double discrete wavelet transform coefficients to estimate a blur kernel length for the captured image.

9. The method of claim 8, wherein the blur kernel length estimate is the pixel distance between two edges in the double discrete wavelet transform coefficients.

10. The method of claim 9, wherein the step of determining a length and direction of the motion blur further comprises performing an autocorrelation analysis over a length of pixels to determine a minimum autocorrelation, the minimum autocorrelation corresponding to the estimated blur kernel length.

11. The method of claim 6, wherein the step of determining the length and direction of the motion blur further comprises the step of determining a blur kernel angle for non-horizontal motion by rotating the observed image signal by an angle between 0 and $\pi$ and performing an autocorrelation analysis.

12. The method of claim 11, further comprising the step of using the length and direction of the motion blur to reconstruct a wavelet transform of the latent sharp image of the captured scene.

13. The method of claim 12, further comprising the step of recovering the latent sharp image of the captured scene by performing an inverse wavelet transform of the reconstructed wavelet transform of the latent sharp image.

14. The method of claim 11, further comprising the step of using the motion blur length and direction to calculate a distance traveled by an object in the captured scene.

15. A digital imaging system for processing blur occurring in a captured image, the system comprising:
  (a) an image sensor for capturing an image of a scene from a pattern of light directed onto the image sensor and converting the captured image into an observed image signal;
  (b) a lens system for imaging the scene onto the image sensor;
  (c) a processor-accessible memory system; and
  (d) a data processor configured to perform the method of claim 10 on a captured image in order to recover the latent sharp image of the captured scene.

16. The digital imaging system of claim 15, further comprising a mask positioned with respect to the image sensor such that light from a scene to be captured impacts the mask before reaching the image sensor, said mask having a non-circular opening for defining the pattern of light striking the image sensor.

17. The digital imaging system of claim 16, wherein the mask has a single rectangular opening.

18. The digital imaging system of claim 17, wherein the processor is configured to compute a convolution of the image signal from the sensor with a wavelet transform to produce a simplified rectangular wavelet coefficient having four active points located at the corners of a transformed blur kernel of the image.

19. A method of detecting a defocus blur radius in an image captured by a digital imaging device and recovering a latent sharp image from the captured image, the method comprising the steps of:
  (a) computing a double discrete wavelet transform of the captured image signal to produce transform coefficients of the captured image signal, the transform coefficients of the captured image signal including a sparsified signal of the blur kernel and a sparsified signal of the latent sharp image;
  (b) detecting the defocus blur radius;
  (c) using the detected defocus blur radius to reconstruct a wavelet transform of the latent sharp image; and
  (d) recovering the latent sharp image by performing an inverse wavelet transform of the reconstructed wavelet transform.

20. The method of claim 19, further comprising the steps of using the defocus blur radius to calculate a distance between a location of at least one object in a captured image and a location of the at least one object in a latent sharp image, and using the calculated distance to focus a digital imaging device.

21. The method of claim 20, wherein the step of using the calculated distance to focus the digital imaging device further comprises inputting the calculated distance into a processor within the imaging device, the processor using the calculated distance to send a signal to a lens in the digital imaging device to adjust a position of the lens.

* * * * *

UNITED STATES PATENT AND TRADEMARK OFFICE
CERTIFICATE OF CORRECTION

| | | |
|---|---|---|
| PATENT NO. | : 9,143,687 B2 | Page 1 of 1 |
| APPLICATION NO. | : 13/830597 | |
| DATED | : September 22, 2015 | |
| INVENTOR(S) | : Hirakawa et al. | |

It is certified that error appears in the above-identified patent and that said Letters Patent is hereby corrected as shown below:

In the claims

Claim 2, Column 14, Line 37, change "step" to --steps--.

Signed and Sealed this
Eighth Day of March, 2016

Michelle K. Lee
*Director of the United States Patent and Trademark Office*